United States Patent [19]

Zwillich et al.

[11] 4,432,036
[45] Feb. 14, 1984

[54] SWITCHGEAR WITH STAB-POSITIONING SYSTEM

[75] Inventors: Alexander Zwillich, Pittsburgh; Carl R. Merola, Monroeville; Stephen S. Ciccotelli, Pitcairn, all of Pa.

[73] Assignee: Westinghouse Electric Corp., Pittsburgh, Pa.

[21] Appl. No.: 512,567

[22] Filed: Jul. 11, 1983

Related U.S. Application Data

[63] Continuation of Ser. No. 241,920, Mar. 9, 1981, abandoned.

[51] Int. Cl.$^3$ .............................................. H02B 1/04
[52] U.S. Cl. .................................. 361/337; 361/336; 200/50 AA; 339/126 R
[58] Field of Search ........... 339/125 R, 126 R, 132 R; 174/152 R; 200/50 AA; 361/335–339, 343–345, 429

[56] References Cited

U.S. PATENT DOCUMENTS

| | | | |
|---|---|---|---|
| 2,659,766 | 11/1953 | Fot | 339/126 R |
| 3,562,593 | 2/1971 | Bould | 200/50 AA |
| 3,792,217 | 2/1974 | McConnell | 174/152 R |
| 4,002,864 | 1/1977 | Kuhn | 200/50 AA |
| 4,002,865 | 1/1977 | Kuhn | 200/50 AA |
| 4,144,402 | 3/1979 | Klug | 174/152 R |
| 4,272,798 | 6/1981 | Merola | 200/50 AA |

Primary Examiner—G. P. Tolin
Attorney, Agent, or Firm—D. S. Boles; Benjamin Hudson, Jr.

[57] ABSTRACT

A circuit breaker switchgear housing device having a stab positioning system whereby a draw-out circuit breaker having separable contacts is contained in the switchgear housing. A stab positioning system is utilized so as to precisely locate stabs so that a circuit breaker having contact clusters which are electrically attached to the circuit breaker contacts make accurate and uniform contact with the stabs. The stabs are generally a rectangular-shaped bar with one of the ends being rounded off. Cut into two sides of the stab and opposing each other are notches. The stab is inserted into a retainer or positioning washer which has a bayonet-type lock opening into which the stab is inserted and rotated 90°, thereby prohibiting axial movement of the stab with respect to the washer. A retainer or positioning washer having an opening slightly larger than the stab cross-section is used to rigidly position an inserted stab, prohibiting rotational movement with respect to the opening in the stab. An insulating partition which is rigidly attached to the switchgear housing, facilitates the positioning and attachment of the two positioning washers containing the stab. The positioning washers are separated by a ledge contained in the insulating partition.

2 Claims, 6 Drawing Figures

SWITCHGEAR WITH STAB-POSITIONING SYSTEM

This application is a continuation of application Ser. No. 241,920, filed Mar. 9, 1981, now abandoned.

BACKGROUND OF THE INVENTION

1. Field of the Invention

This invention relates, generally, to metal-enclosed switchgear and more particularly to a stab-positioning system for the primary disconnect contact system and current conductors of metal-enclosed switchgear having removable draw-out circuit breaker units.

2. Description of the Prior Art

Whenever a draw-out circuit breaker device is utilized, the maintenance, testing and installation require that the circuit breaker be pulled out from or put back into a metal-enclosed switchgear housing. This requires the making and breaking of contact between the circuit breaker mechanism itself and current carrying conductors in the switchgear metal-enclosed housing. Generally, the circuit breaker apparatus will have a cluster arrangement having resilient fingers which move in conjunction with the circuit breaker itself making and breaking contact with fixed conductors, which are generally referred to as stabs and are insulated from and rigidly attached to the switchgear metal-enclosed housing. Such a scheme is taught in U.S. Pat. No. 4,002,865, "Draw-Out Type Circuit Interrupter With Interlocked Levering Mechanism", issued Jan. 11, 1977, to Kuhn et al; U.S. Pat. No. 4,002,864, "Enclosed Circuit Interrupter With Interlocked Safety Barrier", issued Jan. 11, 1977, to Kuhn et al; U.S. Pat. No. 3,562,593, "Metal-Enclosed Switchgear With Vertically Disposed Conductors", issued Feb. 9, 1971, to Bould, all assigned to the assignee of the present invention. These, as well as other types of draw-out switchgear require precise positioning of the stab unit so that no voltage drop or excess heat is produced at the point of electrical contact between the cluster and stab connection. This requires alignment of the stabs during the construction, maintenance and testing aspects of the circuit breaker. Therefore, some stab alignment schemes utilize extensive and complicated arrangements to ensure proper stab alignment.

It is desirable to have a stab which is easier to position in the switchgear enclosure, provides precise alignment and requires less attention at the time of manufacture, test, maintenance and replacement. It is also desirable to have a stab arrangement which is less complex and requires fewer parts. Such a scheme is taught in the present invention.

SUMMARY OF THE INVENTION

Briefly stated, a circuit breaker having separable contacts is contained in a switchgear housing. A stab positioning system is taught so as to provide precise alignment between the stab which is contained in the switchgear housing and the cluster which is mounted on a circuit breaker. The stab is generally a bar having notches on opposing sides. A retainer or positioning washer having a locking aperture is utilized for permitting the insertion and rotation of the stab thereby positoning the stab so as to prohibit the axial displacement of the stab with respect to the first positioning washer. A retainer or positioning washer having an opening slightly larger than that of the stab is utilized so that upon the insertion of the stab, the stab is prohibited from rotating with respect to the opening in the positioning washer. A partition, which is rigidly attached to the switchgear housing, is used to contain the positioning washers which are holding the stab. The partition may be cylindrical having a ledge on the inner wall which separates the positioning washers as well as provides a method whereby a fastening device may rigidly attach the two washers together, thereby securely and precisely locating the stab in the insulating partition and therefore the switchgear housing.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Throughout this description, like components will be identified by like numerals. Modified components similar in structure to previously described components, but differing in the view shown, will be identified by the previously assigned numeral with the addition of a prime (').

Figure 1:
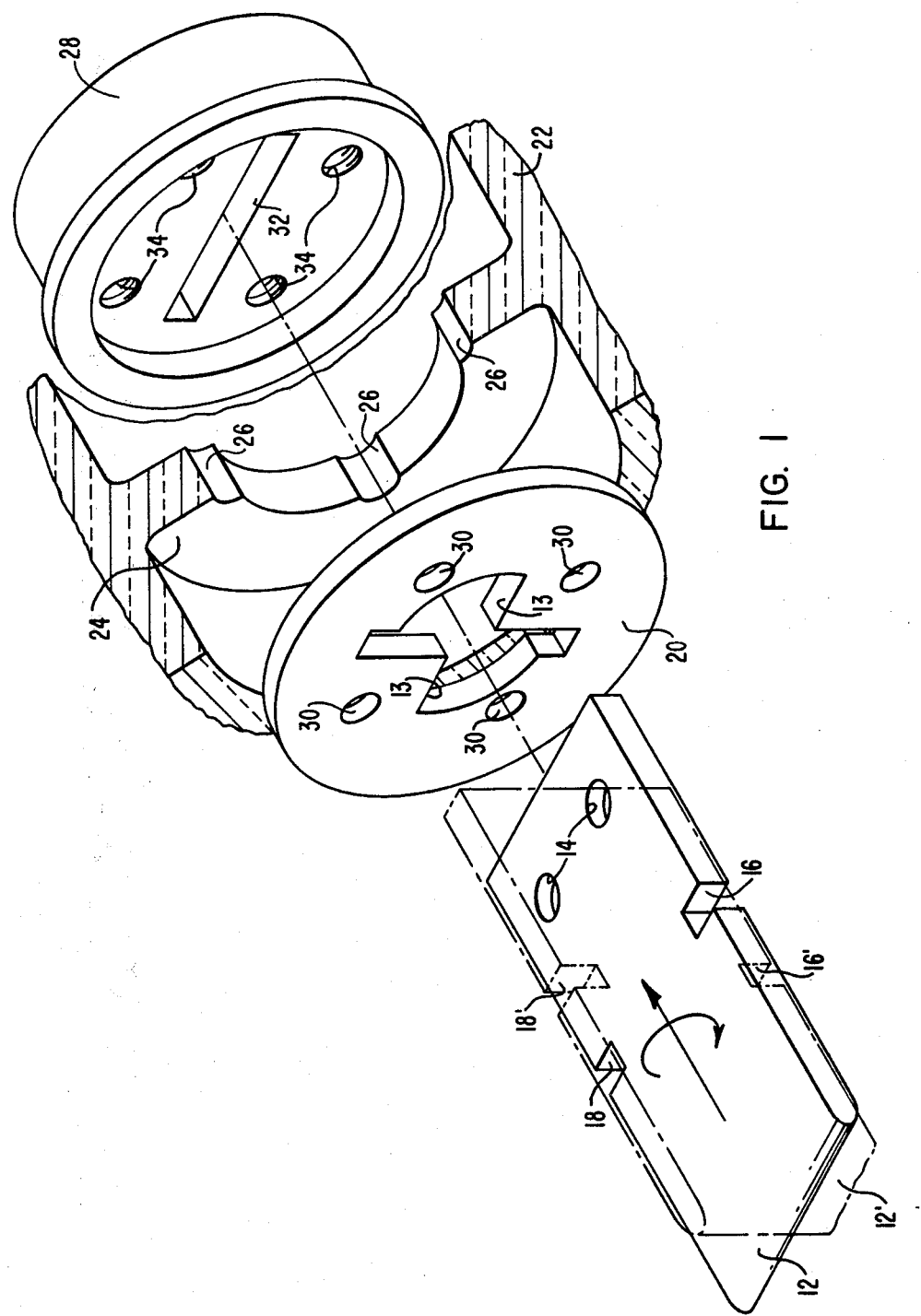
FIG. 1 is an exploded of the stab positioning system.

Referring now to FIG. 1, there is shown an exploded view of the stab positioning system. While only one stab is shown, it is to be understood that the stab system may be used for direct current or single-phase systems and is typically utilized in multi-phase alternating current systems requiring a number of stabs. The stab 12, 12' is made of electrically conducting material, such as copper and is shown in two positions. The construction of a stab positioning system requires that the stab be in a vertical position 12', shown in dotted lines and being then inserted into a retainer or stab positioning washer 20. The stab positioning washer 20 may be made of conducting or non-conducting material such as copper or glass polyester, respectively. Upon the insertion of the stab 12', the notches 16' and 18' are made to align with the locking aperture of the stab positioning washer 20 and are slightly wider than the cross-sectional area of the stab positioning washer 20. The stab 12' is then rotated in a clockwise fashion until the stab 12' makes contact with the ledges 13 of the locking aperture of the stab positioning washer 20, thereby interlocking the stab positioning washer 20 with the stab 12. This therefore prohibits axial movement of the stab 12 with respect to the positioning washer 20. The stab positioning washer 20 and the stab 12 are then inserted into a support member or insulating partition 22 until the first stab positioning washer 20 contacts the insulating partition ledge 24, and the holes 30 through the stab positioning washer 20 line up with the key recesses 26 contained in the insulating partition ledge 24 of the insulating partition 22. A retainer or stab positioning washer 28 is then installed from the opposite side of the insulating partition ledge 24 so that it contacts the insulating partition ledge 24, thereby prohibiting the stab 12 from rotational movement with respect to the aperture in the stab positioning washer 28. The stab slot 32 lines up with and engages the stab 12, and the holes 34 through the stab positioning washer 28 line up with the key recesses 26 contained in the insulating partitioning ledge 24 of the insulating partition 22.

Figure 6:
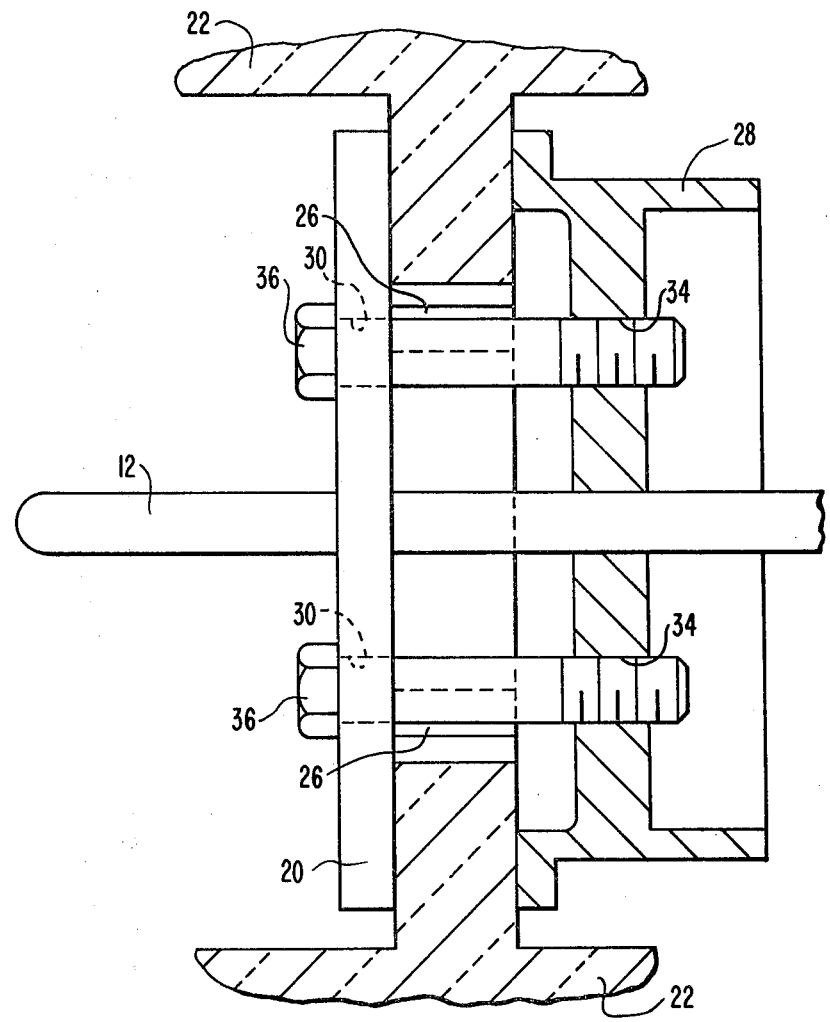
FIG. 6 is a side-sectional view taken through FIG. 4.

Referring now to FIG. 6, there is shown a cross-sectional view of the assembled stab positioning system. Rigidly fastening the system are bolts 36 which are placed through the holes 30 contained in the stab positioning washer 20, through the key recesses 26 and into the holes 34 contained in the stab positioning washer 28. This rigidly fixes the stab in the insulating partition 22 and in all three spatial directions.

Figure 2:
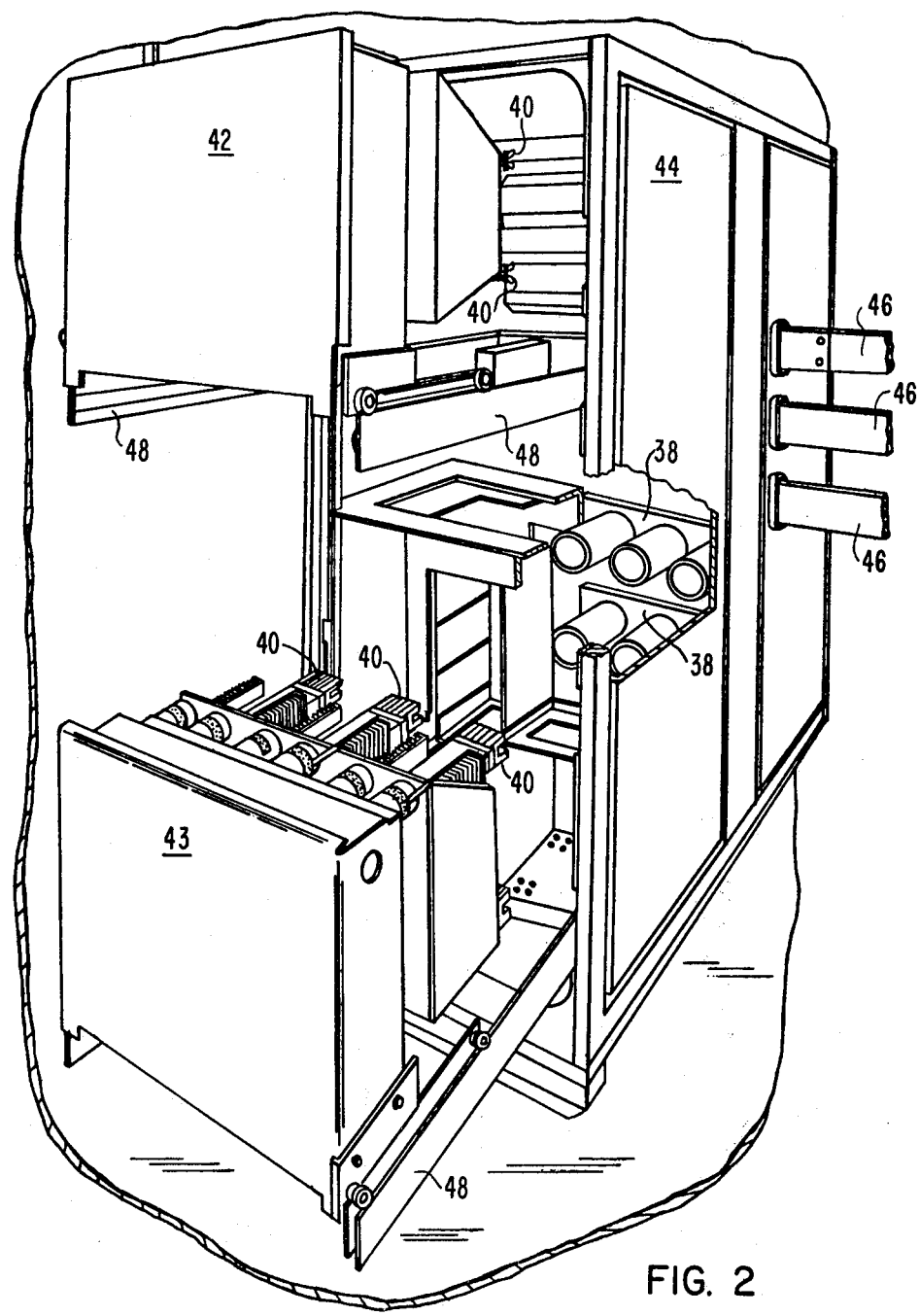
FIG. 2 is an illustration of the circuit breaker switchgear and housing which utilize the stab positioning system.
Figure 4:
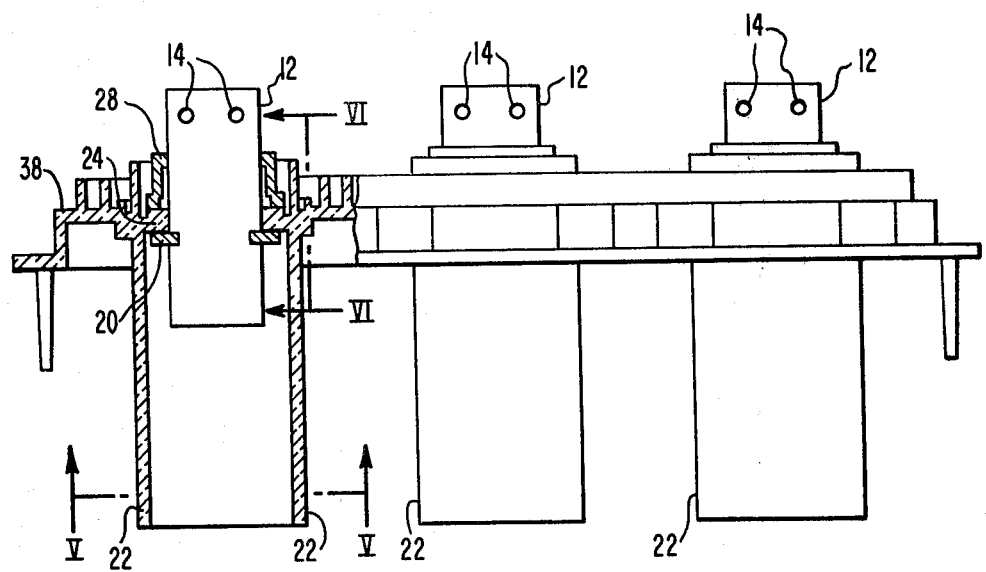
FIG. 4 is a diagrammatic top view illustrating the stab positioning system.

Referring now to FIG. 4, there is shown a diagrammatic view illustrating the three stab positioning devices for a three-phase alternating current system. The support member or insulating partitions 22 are placed so as to provide adequate inter-phase electrical isolation as well as space for electrical and mechanical interconnection with the circuit breaker apparatus. The insulating partitions 22 which may be any suitable insulating material such as, for example, glass polyester, may be constructed so as to be an integral assemblage forming part of a stab positioning mounting frame 38. The stab positioning mounting frame 38 is then assembled in the switchgear housing as shown in FIG. 2. The stabs 12 may be electrically connected to the line or load side of a power distribution system utilizing the bus-bar mounting holes 14.

Figure 5:
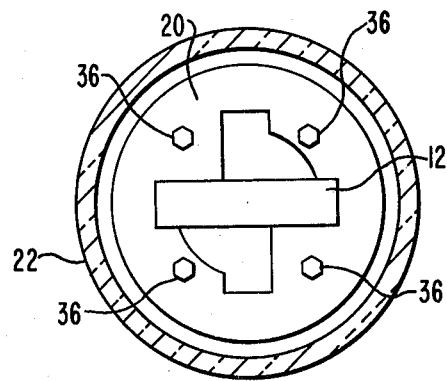
FIG. 5 is a sectional view taken through FIG. 4 illustrating the stab position system.

Referring now to FIG. 5, there is shown a cross-sectional view V—V taken through the assemblage shown in FIG. 4. Shown is the insulating partition 22 encircling and holding the stab positioning system. The bolts 36 pass through the stab positioning washer 20, spatially positioning the stab.

Figure 3:
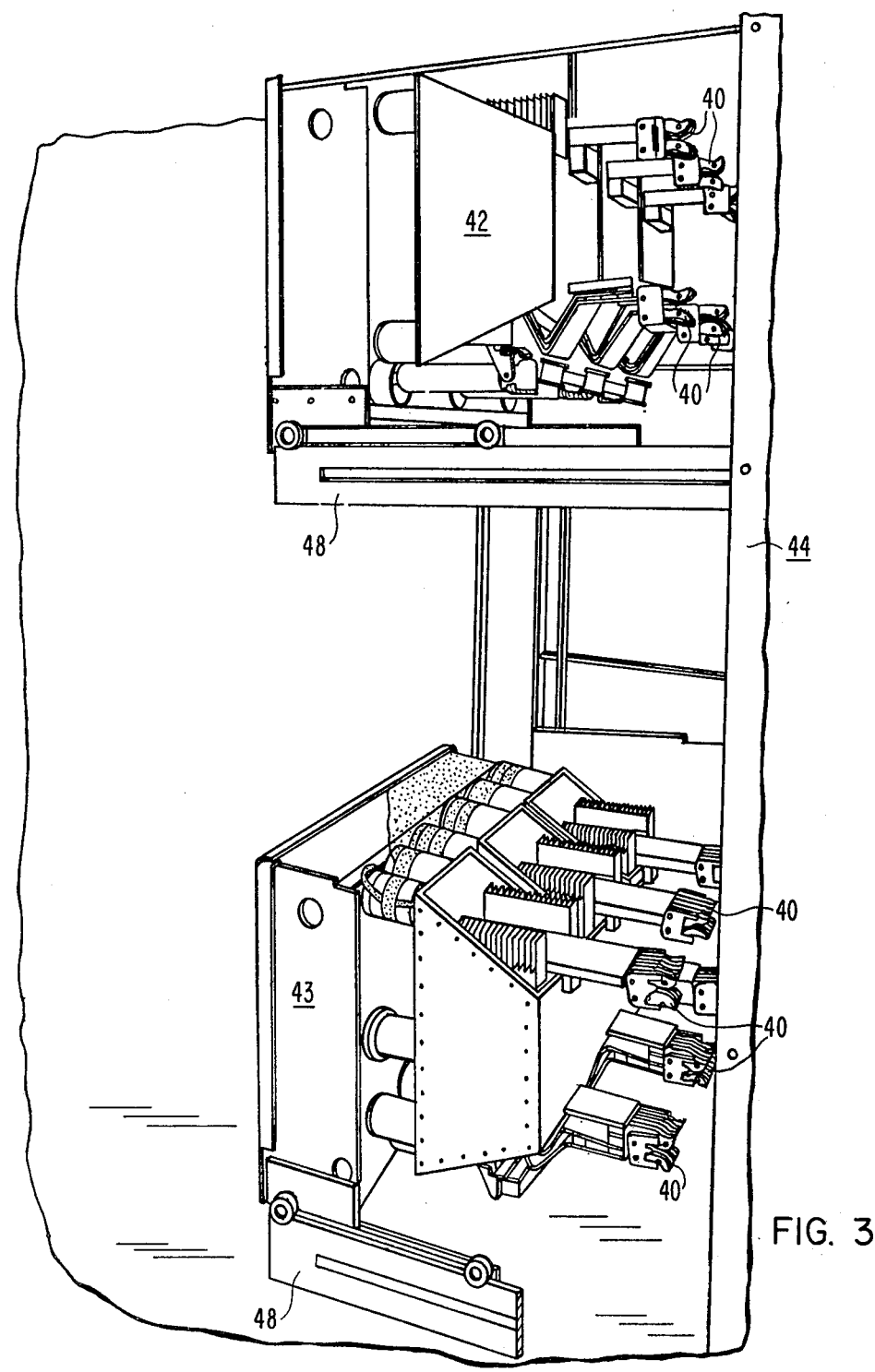
FIG. 3 is a differing view of that shown in FIG. 2 illustrating the circuit breaker mechanism specifically.

Referring now to FIG. 2, there is shown a switchgear housing 44 which contains draw-out circuit breakers 42 and 43. The electrical interconnection of the draw-out circuit breakers 42 and 43 are through contact clusters 40, also shown in FIG. 3, which have resilient fingers so as to make and break electrical contact with the associated stabs. The stab positioning system mounting frame 38 is mounted behind each draw-out circuit breaker 42, 43 (shown for illustration purposes behind draw-out circuit breaker 43 only). The draw-out circuit breakers 42 and 43 move in and out of the switchgear housing 44 on a sliding track 48. Upon the insertion of the draw-out circuit breakers 42 and 43, the contact clusters make electrical contact with the stab which is recessed in the corresponding insulating partition 22. The insulating partition 22 provides a number of advantages including, electrical isolation, elimination of inter-phase shorts and flashovers. In a typical three-phase alternating current system, six stab positioning systems are utilized, three for the line side of the draw-out circuit breaker and three for the load side of the draw-out circuit breaker.

It is to be understood that the present invention may utilize circuit control apparatus other than draw-out circuit breakers such as molded case circuit breakers or swtiches as well as other non-draw-out circuit control devices without departing from the spirit and scope of the present invention. Additionally, it is to be understood that the present invention is readily adaptable for use in non-switchgear housing environments. Further, it is to be understood that the insulating partition may be of a different type, for example, one which does not completely enclose the stab. Also, the bus-bar mounting holes contained in the stab may be located in the end of the stab or the shape of the stab need not be rectangular.

Therefore, the disclosed invention produces a stab positioning system which is uncomplicated, using few parts, achieving a high degree of precision location and orientation, eliminating design complexity and tedious assembly procedures.

What we claim is:

1. Switchgear apparatus, comprising:
   (a) a housing;
   (b) a support means disposed within the housing for supporting a conductor means for connection with an external electrical circuit;
   (c) a first lock retaining means abutting said support means having a vertical aperture therein supporting in a vertical position an electrical stab means for electrical connection with the conductor means;
   (d) a horizontal opening formed by ledges in the first lock retaining means which is connected to said vertical aperture whereby the electrical stab means is rotated from the vertical aperture position to the horizontal opening position;
   (e) a second lock retaining means abutting the support means, axially spaced from the first lock retaining means having a horizontal aperture therein supporting and locking the electrical stab means in a horizontal position after rotation thereof to the horizontal opening position; and
   (f) circuit breaker means connected to the electrical stab means for distribution of power in the switchgear apparatus.

2. Switchgear apparatus as recited in claim 1 wherein the circuit breaker means is a draw-out type circuit breaker having resilient fingers to make and break electrical contact with the electrical stab means.

* * * * *